Sept. 5, 1950 S. A. SCHERBATSKOY 2,521,130
SEISMIC EXPLORATION BY MEANS OF PERIODIC EXCITATION
Filed June 10, 1943 2 Sheets-Sheet 1

INVENTOR
George A. Scherbatskoy

Patented Sept. 5, 1950

2,521,130

UNITED STATES PATENT OFFICE 2,521,130

SEISMIC EXPLORATION BY MEANS OF PERIODIC EXCITATION

Serge A. Scherbatskoy, Tulsa, Okla.

Application June 10, 1943, Serial No. 490,374

8 Claims. (Cl. 181—0.5)

My invention relates to seismic prospecting systems and more particularly to systems used for seismological exploration and provides a new and improved method for receiving and recording seismic vibrations and the like.

Seismological exploration consists in surveying the geological structure of the subsurface and determining the depths and slopes of subsurface strata with a view towards locating formations favorable to the accumulation of oil and other valuable minerals.

One of the methods of determining the subsurface strata comprises creating earth vibrations by detonating an explosive at or near the surface of the earth and producing seismograms, i. e., graphical records of vibrations after they have been influenced by various geological strata and returned to the surface of the earth. These records are used thereafter to furnish data from which the geological structure may be deduced and plotted. This method has been designated as the method of seismic prospecting by transient excitation and consists essentially in determining the time interval required for a shock originating with the explosion of a quantity of dynamite to reach a distant point. In the seismic method by transient excitation, frequency does not enter into calculations and it enters only as regards the selective treatment by the receiving apparatus and some earth materials, since some frequencies are amplified more than others in the receiving apparatus and some are absorbed or selectively reflected or refracted by certain earth materials.

Another method of determining subsurface strata has been suggested in the past and designated as the seismic prospecting method by continuous excitation. In this method the seismic waves are generated by continuous and periodic excitation and the behavior of the earth is studied in relation to the frequency of the excited seismic waves. Certain characteristic frequencies corresponding to resonant conditions of the earth are obtained, and yield important information regarding the geological structure to be determined.

The present invention relates to the seismic prospecting methods by continuous excitation. In these methods seismic waves of varying frequencies are being imparted to the earth, and the corresponding motion of the earth's surface is being recorded at a distant point. One of the methods of seismic prospecting by continuous excitation has been described in the U. S. Patent 1,790,080, issued on January 27, 1931, to A. N. Stanton.

It is apparent that in all measurements involved in the method of seismic prospecting by continuous excitation certain requirements as to measurability of the signal received have to be fulfilled. Among these requirements is a satisfactory signal to noise ratio. The signal here is represented by the various waves that are brought into being as a result of the periodic excitation of the earth by means of a vibrator, and by noise is meant what is usually referred to as microseisms. These microseisms are produced by causes of various origins and these origins include effects of ocean waves on the surface, effects of temperature changes in the earth, effects caused by wind on various objects on the earth, effects due to the motion of rivers in the neighboring regions and also to some extent vibrations caused by animal life. A great amount of study has been devoted to microseisms and it has been established that at least in the region of frequencies that are used in seismic exploration the frequencies of the microseisms are arranged in a continuous spectrum, i. e., all frequencies within a certain range are represented. Microseisms are somewhat similar to electrical thermal noises caused by thermal excitation in electrical conductors, and effects known as Brownian motions, and to effects that are encountered in radiation measurements due to the quantized propagation of radiations. In all these effects the energy representing the phenomena being considered is distributed over a wide range of frequencies and the power represented by any single discrete frequency is zero. The effective power is entirely dependent upon a band filter to which the measuring apparatus is responsive and in the case of strictly uniform distributed energy as in electrical thermal noise the power decreases directly with the width of the band.

In the prior methods of seismic prospecting in which a transient impulse was generated in the earth by means of a dynamite explosion it was necessary to produce a signal wave corresponding to a reflected or a refracted wave having an amplitude of the order of $10^{-7}$ centimeters in order to override by ratio of 10 to 1 the microseism noise which is of the order of $10^{-8}$ centimeters. In order to accomplish these results by means of dynamite an energy of the order of 100 foot tons has to be applied to the earth. It is well known that the process of exploding dynamite in order to produce an earth vibration is very inefficient and a great amount of heat is generated and that various other violent disturbances resulting in permanent deformation of the earth in the vicinity of the dynamite explosion do not contribute efficiently to the propagation of the elastic waves in the earth. Recently more efficient processes for imparting seismic energy into the ground have been tried as for example by means of an arrangement described in the U. S. Patent 2,203,140, issued June 4, 1940, to W. G. Green. By means of these processes good results have been obtained with only 10 foot tons of energy and it can be assumed that this figure could be reduced somewhat further by efficient design of the apparatus for initiating the elastic waves in the earth.

It is apparent that in the seismic method by periodic excitation, each independent measurement is a measurement of the amplitude of a single discrete frequency and that if sufficient time is available to perform the measurement of the amplitude of this discrete frequency, the band width to which the measuring apparatus responds can be reduced almost indefinitely. Taking as a starting point a measuring apparatus of the conventional type that responds to a band width of 100 cycles, it has been found that the amount of energy that is required is of the order of 10 foot tons. It is obvious that if for example the band width of the apparatus is reduced to 1 cycle per second, the amount of energy required would be only one foot ton. Furthermore, if the band width were to be reduced to .01 cycle per second the amount of power required would be only $\frac{1}{10}$ foot ton.

Heretofore one of the very important problems which have been incapable of solution was the design of a generator that would impress upon the earth a periodic excitation having sufficiently large energy to produce a reflected or refracted wave at the receiving instrument that would override the noise by a sufficient margin. Very large vibrators obviously could be constructed but they would be extremely cumbersome and expensive to use and so far this has been found to be impractical and no industrial work has been done in connection with exploration for petroleum in which the periodic excitation was used.

It is an object of my invention to provide a detecting apparatus that is many times more sensitive than previously used for detecting the incoming waves and that will permit the use of a generator that is many times smaller than the previous ones used in order to accomplish this increase in sensitivity. It is necessary that the instrument be provided with an extremely sharp filter having a band width of the order of $\frac{1}{100}$ of a cycle per second and it is further necessary to provide a convenient means for shifting the mid-frequency of this band width so as to make it follow exactly the varying frequency of the generator that imparts the vibrations to the earth.

The general arrangement and further objects of my invention will be more clearly understood with reference to the drawings in which:

Fig. 1 illustrates schematically an arrangement for generating and receiving seismic waves in accordance with my invention.

Fig. 2 gives a more detailed representation of an arrangement that is similar to the one shown in Fig. 1.

Figure 5:
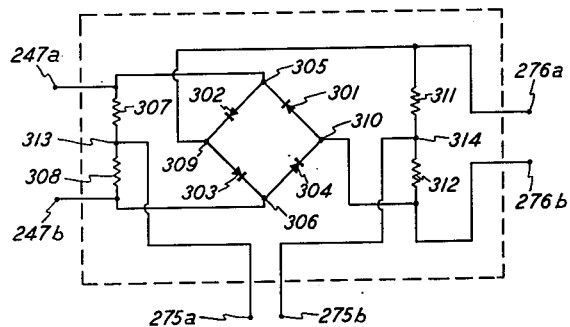

Fig. 5 gives a schematic diagram of a double balanced modulator.

Figure 1:
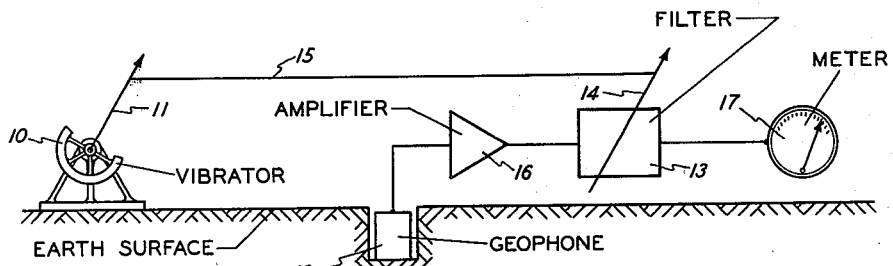

Referring now more particularly to Figure 1 there is shown diagrammatically the working principle of my invention. Numeral 10 indicates a vibrator adapted to vibrate the earth. The frequency of the vibrator is capable of continuously varying as designated symbolically by means of an arrow 11. This generator therefore excites the earth and sends out elastic waves. Numeral 12 is a geophone adapted to pick up the earth vibrations. Numeral 13 is an extremely sharp band pass filter the mid-frequency of which can be varied as designated symbolically by means of an arrow 14. An arrangement is provided to cause this frequency to follow exactly the frequency of generator 10 as designated symbolically by means of a line 15 connecting the arrows 11 and 14. Numeral 16 designates a vacuum tube amplifier and numeral 17 dsignates a meter adapted to indicate the output of the filter 13. If the frequency of the generator 10 is varied then the mid-frequency of the filter 13 is made to follow the frequency variation of the generator and, consequently, the signal to noise ratio capable of being produced by the detecting apparatus is very large and is dependent primarily upon the width of the band to which the system as a whole is responsive. The filter 13 that I propose to use is only a small fraction of a cycle wide and very good signal to noise ratio can be produced and transmitted to the meter 17.

Figure 2:
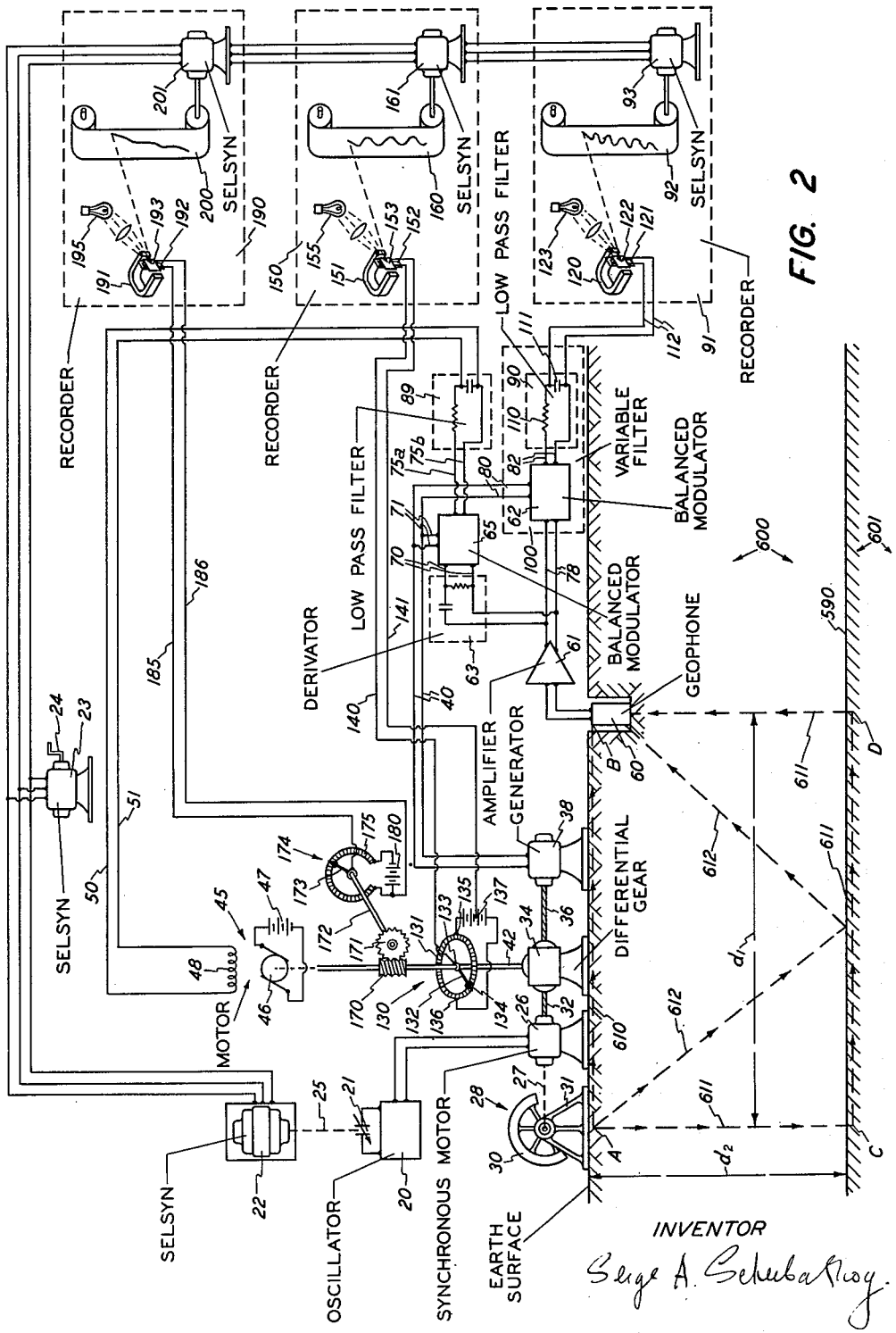

Figure 2 shows a detailed representation of an arrangement similar to the one shown in Figure 1. Referring now more particularly to Fig. 2, numeral 20 indicates an oscillator which is of the conventional vacuum tube type, the frequency of which can be varied by means of a suitable control element such as a condenser 21. The condenser 21 is adapted to be driven by a Selsyn motor 22, the said motor 22 being in synchronous connection with a manually driven Selsyn motor 23. The Selsyn motor 23 is made to turn by means of a handle 24 in a manner such that the angular position of the handle 24 at all times corresponds to a definite angular position of the condenser shaft 25 of the condenser 21 and, consequently, to each angular position of the handle 24 there corresponds a definite frequency of the oscillator 20. The oscillator 20 is connected to a synchronous motor 26 and this motor consequently rotates at a rate that is determined by the frequency of the oscillator 20. The motor 26 by means of shaft 27 drives an eccentric type earth vibrator 28. Such earth vibrators have been described in the past by other workers and no detailed description is required here. It is sufficient to say that this vibrator may comprise a large flywheel 30 half of which is removed, this flywheel being mounted upon a suitable support 31. The earth vibrator that I am using in the present embodiment may be substantially similar to the one described in the U. S. Patent 1,790,080, issued on Jan. 27, 1931, to Austin N. Stanton. It is apparent that the unbalanced wheel when driven at a high rate of speed produces a varying pressure on the surface of the ground and thus generates vibrational waves in the ground. The synchronous motor 26 also drives by means of a shaft 32 a differential gear 34, the said differential gear being connected by means of a shaft 36 to a generator 38. The synchronous motor 26 and the generator 38 are of an identical construction, and, therefore, if they are synchronously run, the voltage input of the synchronous motor 26 is of the same frequency as the voltage output of the generator 38, the phase difference between said input and output being dependent upon the relative angular displacement of the rotors of the motor 26 and the generator 38 respectively. Consequently, the generator 38 generates a voltage across the leads 40 which at all times has exactly the same frequency as the voltage supplied by the oscillator 20 but has a phase that can be shifted continuously with respect to the voltage of the oscillator 20 by means of the differential gear 34. The third shaft 42 of the differential gear 34 is connected to a small slow speed D. C. motor 45 the armature of which is designated as 46 and is energized from a conventional source of power as for example the battery 47 and the field winding 48 of which is adapted to external excitation. The motor 45 is adapted by means of the shaft 42 to control the differential gear 34 and in such a manner to control the relative phase position of the rotors of the synchronous motor 26 and of the generator 38. When the shaft 42 is stationary, the shafts 32 and 36 of the differential gear rotate in opposite directions, but at exactly the same number of revolutions per second. Whenever the shaft 42 is made to rotate slowly by means of the motor 45, the shaft 36 is made to slowly advance or retard with respect to shaft 32 in a manner such that the first position of the rotor of the motor 26 can be made to gradually advance or fall behind the first position of the rotor of the generator 38.

It is apparent that the control of the motor 45 and, consequently, the control of the phase between the input voltage of the motor 26 and the output voltage of the generator 38 can be effected by means of the voltage applied across the excitation winding 48 of the motor 45. For example, if the polarity of the voltage applied across the leads 50, 51 connected to the terminals of the winding 48 is such, that the lead 50 is made to be electrically positive with respect to the lead 51, the motor 45 will rotate in a given direction and introduce an advance in phase of the rotor of the generator 38 with respect to the rotor of the motor 26. Conversely, as the lead 50 is made negative with respect to the lead 51, the motor 45 will rotate in the opposite direction and will introduce a retardation in phase of the rotor of the generator 38 with respect to the rotor of the motor 26.

A geophone 60 is located at a distance $d_1$ from the earth vibrator 28 and is set into a continually vibratory motion by the various waves that arrive at the geophone 60 from the vibrator 28 through several paths that shall be described hereafter. The geophone output is subsequently amplified in the amplifier 61. The output terminals of the amplifier 61 are connected directly to a balanced modulator 62 and are also connected to the input terminals of a derivator 63, the output terminals of said derivator being connected to a balanced modulator 65. The derivator 63 consists of a circuit that is adapted to produce at its output an electrical voltage the instantaneous value of which is proportional to the first time derivative of the voltage at its input. The exact behavior of the circuit of this type is well known in the art and its description can be found in the U. S. Patent 2,099,536 issued on June 11, 1940, to S. A. Scherbatskoy and J. Neufeld wherein a derivator circuit is illustrated in Fig. 4a.

Balanced modulators designated by the blocks 62 and 65 are well known in the art and have been described in an article by R. S. Carruthers on "Copper Oxide Modulators in Carrier Telephone Systems," The Bell System Technical Journal, vol. XVIII, 1939, pp. 315–337. The type of the circuit contained in rectangles 62 and 65 is illustrated in Fig. 2c page 318 of the said article and is also designated as a ring modulator or a double balanced modulator. By double balanced is meant a modulator in which each input is balanced out from the output, and the output contains therefore substantially only the modulation products. The structural and operative characteristics of a double balanced modulator will be explained more in detail in connection with Figure 5.

The modulators 62 and 65 are adapted to produce at their outputs voltages that are equal to the products of the voltages impressed at their inputs. As shown in the figure, the modulator 65 has one pair of its input terminals designated by 70 connected to the output of the derivator 63 and the other pair of its input terminals, designated by 71 connected to the output of the generator 38 by means of leads 40. Therefore, the modulator 65 produces across its output terminals 75a, 75b modulation products of voltages derived from the derivator 63 and the generator 38. In a similar manner, the modulator 62 has one pair of its input terminals, designated by 78 connected to the output of the amplifier 61 and the other pair of its input terminals, designated by 80 connected to the output of the generator 38 by means of leads 40. Therefore, the modulator 62 produces across its output terminals 82 modulation products of voltages derived from the amplifier 61 and the generator 38. The outputs of the modulators 62, 65 are respectively connected to low pass filters 89, 90 which are adapted to pass only extremely low frequencies, i. e., frequencies ranging from zero up to a small fraction of a cycle.

The output of the filter 90 is connected to a photographic recorder contained within a dotted rectangle 91 and comprising a photosensitive strip of paper 92 driven by the Selsyn motor 93 upon which in a manner that shall be described hereafter a record is obtained showing the variation of the output of the filter with respect to the impressed frequency. The Selsyn 93 is driven synchronously with the Selsyn 23.

The output of the low pass filter 89 is connected through the leads 50, 51 to the excitation winding 48 of the motor 45.

The operation of the arrangement shown in Fig. 2 is as follows. The oscillator 20 energizes the synchronous motor 26 which, in turn, drives the unbalanced wheel 28 and imparts upon the earth through the support 31 corresponding vibrations at a frequency that is determined in a final analysis by the setting of the shaft 25 of the Selsyn motor 22. The seismic waves originated by the vibrator 28 will extend in all directions with some type of spherical form. These waves travel considerable distances within the earth, wherein they become attenuated, reflected and refracted by various discontinuity layers present in the earth and are picked up by the geophone 60 together with the microseismic disturbance which have been referred to in the preceding paragraphs. Consequently, the geophone 60 will pick up useful signals resulting from the seismic waves originated by the vibrator 28 and noise signals resulting from the microseismic disturbance.

In ordinary geophysical seismic prospecting the microseisms level has a power such that in frequency bands 100 cycles wide the root mean square equivalent amplitude is of the order $10^{-8}$ centimeters. Naturally, this magnitude varies from place to place and this figure is considered a fact that is realizable in locations that are reasonably quiet, far from ocean surfaces and under conditions of no wind and general calm in the environment. If we maintain the assumption which has been expressed by numerous workers that this noise is substantially uniformly distributed, then it is apparent that the wave amplitude decreases as the band width to which the measuring apparatus responds is reduced. For example, if we were to reduce the band width to 1 cycle, the noise would be reduced by a factor of 100 and the noise amplitude would be reduced by a factor of 10, i. e., it then becomes $10^{-9}$ centimeters. If we reduce the band width to $\frac{1}{100}$ of a cycle, the noise amplitude becomes $10^{-10}$ and, if we reduce the band width still further, the noise becomes reduced correspondingly, and there is no limit to the amount of noise reduction that can be achieved by reducing the band width.

It is apparent that the decrement of the measuring circuit will become smaller at the band width is reduced and, consequently, the time required for a steady state condition to become established in the corresponding apparatus increases. It is further found that the process of increasing the measuring apparatus sensitivity with a corresponding increase in the amount of time required to perform a single measurement can be carried on indefinitely. This manner of achieving very great sensitivity in measuring apparatus is used widely in radiation measurements. In these measurements (for example, the measurement of the ionization current in an ionization chamber used for measuring the intensity of gamma rays) there always is present a certain "statistical fluctuation" which increases the noise. This statistical fluctuation can be reduced more or less indefinitely by increasing the time constant of the measuring apparatus. In certain very difficult readings time constants of as long as several hours have been used and in some cases by means of special circuit known as scale circuits effective time constants of even longer duration have been obtained. In certain fields of geophysical prospecting as for example the radioactivity logging of oil wells, the use of a long time constant in order to reduce noise is an inherent part of the process without which the apparatus would be inoperative.

It is the purpose of my invention to use some of the principles described above in order to reduce the noise that heretofore has been a barrier to a great instrument sensitivity. By reducing the noise it will be possible by the use of my invention to reduce correspondingly the intensity of the seismic wave reflected from lower subsurface beds, and, consequently, the results obtained will provide information regarding the geological conditions at considerably larger depths.

It is therefore apparent, that the geophone 60 picks up the useful signal which is being represented by various waves that are brought into being as a result of the periodic excitation of the earth by means of the vibrator 28, and the noise caused by the microseisms. The output of the geophone 60 is subsequently applied to the amplifier 61 which is of a conventional design.

It has been found that there is an inherent limit to the amplification of the amplifier 61 and this limit depends upon the width of the band to which the amplifier is responsive. It is well known that the output signal of the geophone 60 that it is desired to amplify and which represents the useful seismic signal together with the microseisms is not the only signal appearing across the output terminals of the amplifier 61. The output signal of the amplifiers 61 is usually superimposed upon the undesired noise signal which depends upon the band width of the frequencies to which the amplifier 61 is responsive.

Under ordinary circumstances the greater is the depth of a reflecting bed the weaker is the reflected seismic signal and, therefore, at sufficiently low depths the reflected seismic signal becomes so weak as to be completely masked by the noise signal resulting from microseisms. Therefore, there is a definite limit to the depths of the reflecting geological beds that can be measured. It is also apparent that the signal derived from the geophone should be sufficiently intense as to override the noise due to the amplifier and which results from the combined action of shot effect, thermal agitation, secondary emission, etc.

In order therefore to adapt my arrangement to indicate lower geological beds, it is necessary to take into consideration the microseisms and the thermal noise of the amplifier 61. The instrument should be designed in such a manner as to limit the noise due to microseisms and the noise due to the thermal agitation in the amplifier 61 and to increase the signal to noise ratio.

It is therefore apparent, that across the output terminals of the amplifier 61 we obtain two signals; the signal having the frequency $f$ which is equal to the frequency imparted to the earth by the vibrator 28, and the noise signal which is distributed over a frequency band determined by the characteristics of the amplifier 61 and of the geophone 60, the said noise signal being originated by the microseisms present in the earth and the thermal agitation present in the amplifier 61.

It is the purpose of my invention to eliminate the noise from the output terminals of the amplifier 61 and I am therefore connecting the output terminals of the amplifier 61 to a variable filter included in the dotted rectangle 100. The variable filter 100 can be adjusted to transmit only the frequency $f$ of the seismic waves originated by the vibrator 28 and to attenuate all the noise frequencies.

It is apparent however that the frequency $f$ is a variable frequency, since in accordance with my invention the impressed seismic frequency $f$ imparted to the earth surface by the vibrator 28 is being continuously varied by means of the controlling element 21 driven by the Selsyn motor 22.

Therefore, the tuning of the filter 100 must be continuously varied and be always adjusted so that at any particular moment the filter 100 should transmit only the frequency $f$ corresponding to the useful seismic signal originated by vibrator 28 and to attenuate all remaining frequencies.

In accordance with my invention, the frequency of the seismic waves generated by the vibrator 28 is continuously varied at a very slow speed by slowly turning the handle 24 of the Selsyn 23. By means of an arrangement that shall be described hereafter the mid-frequency of the filter 100 is made to follow the frequency variation of the vibrator 28 and, consequently, the signal to noise ratio at the output terminals of the filter 100 is very large, dependent primarily upon the width of the band to which the filter is responsive. The filter that I propose to use is only a small fraction of a cycle wide and very good signal to noise ratio can be produced.

Consider now the operation of the variable filter 100. As shown in the drawing, the filter 100 includes the balanced modulator 62 in cascade with the low pass filter 90. As described in the preceding paragraphs, two signals are produced across the output terminals of the amplifier 61 and applied to the input terminals of the balanced modulator 62. One signal is the useful seismic signal having the frequency $f$ of the vibrator 28, and the other is the noise signal distributed over a suitable band width in the neighborhood of $f$ and representing the microseisms on the earth surface picked up by the geophone 60 and the noise of the amplifier 61. The modulator 62 also receives across its other input terminals 80 a voltage derived from the generator 38. This voltage has the same frequency as the useful seismic signal applied at the input terminals 78 of the balanced modulator 62. By means that shall be described hereafter I maintain the input voltage applied at the terminals 80 always in phase with the useful seismic signal applied at the terminals 78.

It is apparent, that we obtain across the output terminals 82 of the modulator 62, voltages which represent modulation products of the two input voltages. One of said input voltages has the frequency $f$ of the vibrator 28 and is applied across the terminals 80. The other input voltage contains the useful seismic signal having the frequency $f$, and the noise voltage distributed over a frequency band in the neighborhood of $f$. It is apparent, that the voltage component in the output of the modulator 62 which results from intermodulating the input voltage applied across the terminals 80 with the useful seismic signal is represented by a direct current. It is also apparent, that the modulation product between the noise signal derived from the input terminals 78 and the voltage derived from the terminals 80 produces across the output terminals 82 only A. C. voltage.

As shown in the drawing, the current derived from the output terminals of the modulator 62 is transmitted through the low pass filter 90 having a relatively low limiting frequency determined by the time constant RC of the circuit where R designates the series resistor 110 of the filter 90 and C designates the shunt capacitor 111 of the filter. It is therefore apparent that the filter 90 will transmit the D. C. component of the intermodulation products derived from the terminals 82 and will attenuate the A. C. components of said intermodulation products.

It has been explained above, that the D. C. component of the intermodulation products represents the useful seismic signal detected by the geophone 60 and that the A. C. components which are attenuated by the filter 90 represent the noise due to microseisms and to the amplifier 61. It is therefore apparent, that the voltage derived from the output terminals 112 of the low pass filter 90 represents substantially the useful seismic signal. This signal is subsequently applied to the recorder 91 wherein it becomes impressed upon the strip 92.

The above method is characterized by an extraordinary degree of noise elimination. The method consists essentially in deriving from the leads 40 a voltage having the same frequency and phase as the useful seismic signal derived from the amplifier 61 and in producing a modulation product between the useful seismic signal to be measured and derived from the amplifier 61 and the voltage derived from the leads 40. This modulation product will be a direct current, since the frequency and phase derived from the leads 40 is equal exactly to the frequency and phase of the useful seismic signal derived from the amplifier 61. At the same time it becomes apparent that the noise frequencies accompanying the useful seismic signal are represented by modulation products which are alternating currents and these alternating currents are attenuated by the low pass filter 90.

Consider a component of the noise spectrum obtained from the amplifier 61 and having a frequency $f^1$. Let the modulation product derived from the modulator 62 and corresponding to the frequency $f^1$ be represented by an alternating current having a frequency $$f_1^1$$

It is apparent, that the smaller is the difference between the frequency $f^1$ and the frequency $f$ of the useful seismic signal the smaller will be the frequency $$f_1^1$$

i. e., for those frequency components of the noise voltage which are very close to the signal frequency $f$ the corresponding modulation products are represented by A. C. currents of very low frequencies. On the other hand, the farther apart are the frequency components of the noise spectrum from the frequency $f$ of the useful signal, the higher are the frequencies of the corresponding modulation products. It is the purpose of my invention to transmit only an extremely narrow band of noise frequencies lying in the immediate neighborhood of the useful seismic signal frequency $f$ and to attenuate completely noise frequencies which are farther apart from $f$ in the frequency spectrum. I accomplish this purpose by impressing the output of the modulator 62 upon the low pass filter 90. The low pass filter 90 is adapted to transmit the D. C. current corresponding to the signal $f$ and only a very narrow band of low frequency currents corresponding to a very narrow band of noise frequencies located in the immediate neighborhood of the useful seismic signal frequency $f$.

Let the low pass filter 90 be designated so as to transmit the D. C. current and the frequency band comprised between the frequency zero and a maximum frequency $f_{max}$ where the value $f_{max}$ is relatively small. It is apparent, that the frequency applied to the input of the balanced modulator 62 and corresponding to the frequency zero in the output, is the frequency $f$ of the useful seismic signal and the input frequency of the balanced modulator corresponding to the output frequency $f_{max}$ is the frequency $f+f_{max}$ or $f-f_{max}$. This can be easily verified if we take into consideration that the output frequency of the balanced modulator respresents a modulation product between the input frequencies, i. e., when the input frequencies are $f$ and $f+f_{max}$ the output frequency is $f_{max}$ and when the input frequencies are $f$ and $f-f_{max}$ the output frequency is also $f_{max}$. Therefore, the frequency band transmitted through the whole filtering system 100 including the balanced modulator 62 and the low pass filter 90 is limited by the frequencies $f+f_{max}$ and $f-f_{max}$ and the width of of said pass band is $2f_{max}$. Consequently, the whole filtering system 100 including the balanced modulator and the low pass filter as a whole behaves as an extremely narrow band pass filter the width of which is twice that of the low pass filter. The width of the low pass filter 90 can be decreased almost indefinitely by the use of a circuit consisting of the resistor 110 and the condenser 111, as it has been done in case of the filter 90. Such a circuit can be made to have a "time constant" of several days which corresponds to a band width of the order of $10^{-5}$ C. P. S. Using an arrangement as described, it is possible to measure voltages of known frequency in the presence of a large amount of noise and good results have been obtained when the magnitude of the total noise is several times the magnitude of the voltage representing the signal.

In practice the low pass filter 90 as represented by the condenser 111 and the resistor 110 may be replaced by a conventional low pass filter as for example of a constant K type. However, in the embodiment of Fig. 2 I have chosen a resistance condenser circuit because of the great flexibility of design. A condenser 111 of 4 microfarads and a resistor 110 of 250,000 ohms will provide a substantially uniform response from the frequency zero up to the frequencies of 1 cycle per second and zero response for the frequencies higher than 1 cycle per second. It is apparent that for the above value of the condenser 111 and of the resistor 110 the whole filtering system 100 including the balanced modulator and the low pass filter as a whole behaves as a band pass filter having a band width of 2 cycles per second.

It is also apparent that when the condenser 111 has the value of 4 microfarads and the resistor 110 the value of $2.5 \times 10^6$ ohms, then the filtering system 100 behaves itself as a band pass filter having the band width of 0.2 cycle per second. Or, if the condenser 111 has the value of 4 microfarads and the resistor 110 has the value of $2.5 \times 10^9$ ohms, then the corresponding band width of the filter 100 will be 0.0002 cycle per second. Or, if the condenser 111 has the value of 4 microfarads and the resistor 110 has the value of $2.5 \times 10^{11}$ ohms, then the corresponding band width of the filter 100 will be 0.000002 cycle per second.

The output of the low pass filter 90 is connected to a recording galvanometer 91 which comprises a field magnet 120, and a movable coil 121 which is well damped. A mirror 122 is carried by the coil 121 and light from an incandescent lamp 123 is projected upon the mirror 122 for reflection upon the light sensitive strip of paper 92. A suitable means is provided such as the Selsyn motor 93 for moving the light sensitive paper synchronously with the Selsyn 23 past the light spot reflected by mirror 122. The mirror 122 directs the beam of light upon the strip 92 and is adapted to modify the light in accordance with the magnitude of the signal derived from the filter 100.

Figure 3:
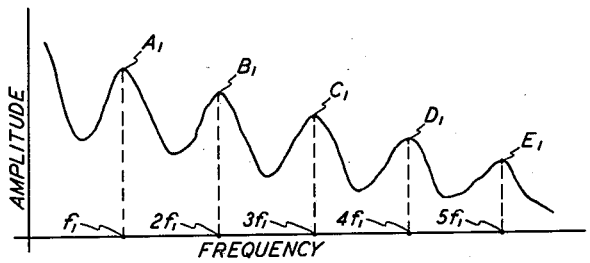
Fig. 3 illustrates an amplitude frequency diagram of the received seismic waves obtained by means of the arrangement of Fig. 2.

The record obtained upon the movable strip 92 represents the earth characteristics with respect to two coordinates and has form of a graph substantially of the type shown in Fig. 3. The longitudinal coordinate parallel to the length of the strip 92 is the frequency coordinate because the strip 92 is moved lengthwise synchronously with the Selsyn 23. To each position of the handle 24 of the Selsyn 23 corresponds a definite frequency $f$ imparted to the earth by the vibrator 28, and by varying said position the frequency $f$ is varied. In a similar manner, to each position of the handle 23 corresponds a definite position of the strip 92 and by varying the position of the handle the position of the strip is varied. Consequently, the strip 92 is moved in a definite time relationship to the variation of the imparted frequency $f$ and at any instant the position of the strip 92 corresponds to a definite value of the frequency $f$. The strip 92 receives the impression of the light beam reflected by the mirror 122, the said light beam being movable in a direction perpendicular to the direction of motion of the strip 92, the said perpendicular direction representing the output of the filter 100, i. e., the useful seismic signal picked up by the geophone 60 and originated by the vibrator 28. Consequently, the graph obtained upon the strip 92 and substantially as shown in Fig. 3 represents the behavior of the earth with respect to two coordinates, one of said coordinates representing the frequency $f$ of the seismic wave imparted to the earth by means of the vibrator 28, the said frequency being varied within a determined range, and the ordinates represent the corresponding values of useful seismic signals picked up by the geophone 60 and corresponding to said frequencies.

It is apparent therefore, that I have provided the necessary apparatus for seismic exploration by means of periodic waves and that because of the extreme sharpness of the filtering apparatus enormous sensitivity has been achieved while still maintaining a satisfactory signal to noise ratio. Consequently, the curve produced by the recorder 91 is a curve in which the response versus frequency characteristics of the earth intervening between the vibrator 28 and the geophone 60 is drawn. Such a characteristic has the well known peaks and valleys in it, which are produced by various reflecting and refracting horizons within the explored region.

It has been stated in the preceding paragraphs that in order to separate the useful seismic signal having the frequency $f$ from the noise signal I am adjusting automatically the phase of the input voltage applied across the terminals 80 of the modulator 62 in such a manner as to make the phase of said input voltage coincide with the phase of the useful seismic signal derived from the amplifier 61.

The phase of the voltage derived from the leads 40 and applied across the input terminals 80 of the modulator 62 is being automatically adjusted by means of the modulator 65 in the following manner:

The voltage derived from the geophone 60 is applied to the modulator 65 through the derivator 63. The derivator 63 because of the nature of its performance in the case of sinusoidal voltages produces a voltage the output of which is 90° out of phase with the voltage at its input, consequently, the voltage supplied to the modulator 65 is always 90° out of phase with the voltage supplied to the modulator 62. This condition is regularly followed for any value of the frequency of the input voltage derived from geophane 60. If we give our attention to the behavior of the modulator 65 it will be observed that across the terminals 75a, 75b there will be produced a D. C. voltage the magnitude of which is proportional to the product of the voltage supplied by the derivator 63 and the voltage supplied by the generator 38. Furthermore, as has been described above the voltage appearing across the output terminals 75a, 75b is positive when the voltage across the input terminals 70 is in phase with the voltage across the input terminals 71 and is negative when this phase relationship is reversed. Furthermore, it is zero when the phase relationship is 90°. Assume now for example that the phase relationship is such that the modulator output produces a D. C. voltage such that the output terminal 75a is positive with respect to the output terminal 75b. This voltage is transmitted through the low pass filter 89 and becomes subsequently impressed across the excitation winding 48 of the motor 45 in such a manner that the motor 45 actuates the differential gear 34 in a given direction and shifts the phase of the voltage produced by the generator 38. This phase gradually shifts until the 90° relationship between the phase of the voltages at the input terminals 71 and the input terminals 70 is achieved. It can be seen that the action of the circuit is such that the phase across the input terminals 71 will always be automatically maintained 90° out of phase with the voltage across the input terminals 70. This phase control is continuous and automatic and any external effect which attempts to bring about a disturbance of this phase relationship is immediately counteracted by the action of the automatic phase control circuit. Consequently, it is important to remember that as long as the automatic phase control circuit is in operation the phase between the voltages at the input terminals 71 is always exactly 90° with respect to phase of the voltage across the input terminals 70.

Consider now the modulator 62. As has been stated previously because of the action of the derivator 63 the phase of the voltage appearing across the input terminals 79 is 90° out of phase with respect to the voltage appearing across the input terminals 78. Consequently, the voltage appearing across the input terminals 78 is always either exactly in phase or exactly out of phase with the voltage across the input terminals 80, i. e., the two voltages are either exactly in phase or exactly out of phase depending upon the initial conditions. Furthermore, it is apparent that once the circuit has been set into operation the phase of the voltage appearing across the input terminals 80 will "lock" with the phase of the voltage across the input terminals 78 and will remain locked as long as the automatic phase control circuit is in operation. Consequently, the suitable ultimate conditions are chosen. The voltages supplied to the modulator 62 are always exactly in phase and the combination of the modulator 62 and low pass filter 90 acts as a band pass filter having an extremely narrow response band. Furthermore, the mid frequency of this filter will automatically follow the frequency of the oscillator 20.

It is therefore apparent, that my method consists essentially in producing by means of the generator 38 a voltage having the frequency $f$ equal to the frequency of the useful seismic signal picked up by the geophone 60 and in phase with respect to the said signal. Assume therefore that the conditions are such that the frequency $f$ of the signal derived from the generator 38 is equal to the frequency $f$ of the useful seismic signal derived from the amplifier 61 and that the phase of the signal derived from the generator 38 coincides with the phase of the useful seismic signal. Under these conditions we obtain across the output terminals of the modulator 62 two resultant voltages one of the said resultant voltages representing the useful seismic signal and the other resultant voltage representing the noise signal. The noise signal becomes subsequently eliminated by the low pass filter 90, and consequently, across the output terminals of said filter we obtain the useful seismic signal.

It is apparent that the band width occupied by the useful seismic signal is zero only when the frequency of the impressed seismic waves originated by the vibrator 28 does not vary with time. However, under ordinary conditions the impressed frequency of seismic waves varies and, consequently, the frequency $f$ of the useful signal derived from the amplifier 61 varies according to a certain rate. Therefore, the useful seismic signal applied across the terminals 78 occupies a certain band width which depends upon the said rate. Consequently, the filter 100 must admit the band width occupied by the said varying useful seismic signal and at the same time it admits unavoidably the undesirable noise signal which is contained within said band width. Therefore, when the frequency of the impressed seismic waves varies rapidly, the band width representing the useful seismic signal is increased and the system responsive to the useful seismic signal must necessarily admit a larger amount of noise. Under ordinary conditions the rate of change of the impressed seismic waves originated by the vibrator 28 does not increase beyond a determined limit and, therefore, the useful seismic signal is contained within a band of a determined and a relatively small width. As shown in the drawing, the current derived from the output terminals of the modulator 62 is transmitted through the low pass filter 90 having a relatively low limit frequency determined by the time constant RC of the circuit where R designates the series resistor 110 of the filter and C designates the shunt capacitor 111 of the filter. If the time constant of the circuit RC is designed so that the charge in the condenser C can just follow the variations of the frequency of the vibrator 28, but is incapable of following faster variations, then the circuit is capable of measuring the useful seismic signal to the limit of measurability.

It can therefore be readily appreciated the rate at which frequency controlling element 21 is varied by means of the handle 24 must be lower than a certain predetermined value. It is apparent that an increase in the variation of frequency of the vibrator 28 broadens the band width of the useful seismic signal and that the band width is zero only when the frequency of the vibrator 28 is constant, and the band width is very small only when the rate of change of frequency is very small. Consequently, whenever it is desired to measure a signal that has a large rate of change of frequency one forcibly admits a larger amount of the noise.

With further reference to Figure 2, I have provided an additional circuit including a rheostat 130. This rheostat is of the type in which there is a stationary circular member 131 of a relatively high resistance and a movable member 132 having one terminal 133 connected to the shaft 42 and the other terminal 134 adapted to slide upon the circular member 131. This stationary member is provided with two taps 135 and 136 said taps being connected to the two terminals of a battery 137. The movable arm 132 is secured to the shaft 42 and when the shaft 42 rotates the movable arm 132 rotates with it and slides along the circumference of the stationary member of the rheostat 130. A wire 140 is connected to the movable arm 132 and another wire 141 is connected to the center tap of the battery 137. These two wires energize a recorder 150. The recorder 150 comprises a field magnet 151, and a movable coil 152. A mirror 153 is carried by the coil 152 and light from an incandescent lamp 155 is projected upon the mirror 153 for reflection upon a light sensitive strip of paper 160. A suitable means is provided such as a Selsyn motor 161 for moving the light sensitive paper synchronously with the Selsyn 23 past the light spot reflected by the mirror 153. The mirror 153 directs the beam of light upon the strip 160 and is adapted to modify the light in accordance with the magnitude of the signal derived from the wires 140 and 141.

It is apparent that the voltage across the wires 140 and 141 indicates at any moment the phase difference between the input of the motor 26 and the output of the generator 38. Since the input of the motor 26 is in phase with the generated seismic waves and the output of the generator 38 is maintained to be in phase with the seismic vibrations received by the geophone 60, it is apparent that the voltage across the wires 140, 141 is indicative of the phase difference between the seismic waves generated by the vibrator 28 and the seismic wave received by the geophone 60. The Selsyn motor 161 drives the strip 160 synchronously with the Selsyn motor 23 and, consequently, the graph produced on the strip 160 indicates the phase versus frequency characteristic of the received seismic waves. The graph obtained by means of the recorder 150 is an important aid to the interpretation of the graph obtained by means of the recorder 91 because, as is well known, any system can be investigated electrically either by means of transient or by means of steady state voltages and the information derived by means of one method can be translated into information derived by means of the other method. In order to reconstruct the transient characteristics of a system it is necessary to know the frequency characteristics and the phase characteristic. The circuit shown in Figure 2 provides both these characteristics.

With further reference to Fig. 2, numeral 170 indicates a worm and numeral 171 indicates a gear meshing with said worm. Numeral 172 indicates a shaft connected to the gear 171 and driving a movable arm 173 of a rheostat 174. The rheostat 174 comprises a stationary circular member 175 which is connected across a battery 180 in a manner such that across the leads 185, 186 there appears a voltage which is a function of the angular position of the shaft 42. This circuit serves to eliminate the ambiguity that is present in the voltage supplied over the wires 140, 141. It is apparent that after the shaft 42 has made a number of revolutions it is possible to determine from the voltage supplied by wires 185, 186 whether all these revolutions occurred in the same direction or whether some of these revolutions occurred in the opposite direction. The gear ratio between worm 170 and pinion 171 is such that the shaft 172 in practice will never execute more than one revolution. And consequently the voltage supplied over wires 185, 186 serves to eliminate the possible ambiguity of the circuit comprising the rheostat 130. The wires 185, 186 go to a recorder 190.

The recorder 190 comprises a field magnet 191, and a movable coil 192. A mirror 193 is carried by the coil 192 and from an incandescent lamp 195 is projected upon the mirror 193 for reflection upon a light sensitive strip of paper 200. A suitable means is provided, such as a Selsyn motor 201 for moving the light sensitive paper synchronously with the Selsyn 23 past the light spot reflected by the mirror 193. The mirror 193 directs the beam of light upon the strip 200 and is adapted to modify the light in accordance with the magnitude of the voltage derived from the leads 185 and 186.

Figure 4:
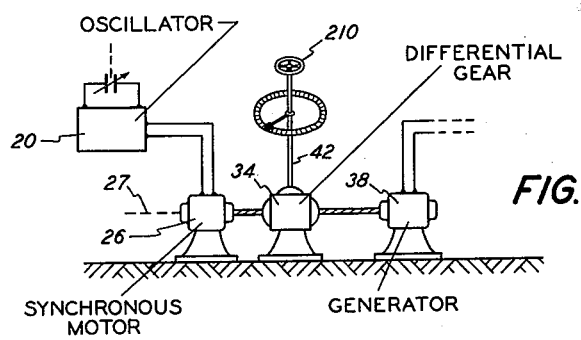
Fig. 4 shows a modified fragment of Fig. 2 in which the phase control between two electrical currents is performed manually.

Fig. 4 shows a modification of part of the circuit illustrated in Fig. 2. In this arrangement the automatic phase control circuit is eliminated and the modulator 65 does not operate. The phase adjustment is provided manually by means of a knob 210. By adjusting this knob it is possible to vary the conditions in the differential gear 34 so that the voltage applied to the motor 26 and the voltage obtained from the generator 38 can be set at any predetermined value and left fixed at that value while the medium is being explored. Under these conditions the phase of the voltages supplied to the input terminals 78 and 80 is no longer fixed but varies in response to the conditions within the explored medium. Consequently the output of the modulator 62 consists of a D. C. voltage, the polarity of which changes as the phase of the earth vibrations picked up by the geophone 60 changes. The characteristic produced by the recorder 91 is, therefore, similar to the characteristic produced previously but instead of being an undirectional curve it is a curve that oscillates from positive to negative values every time the phase of the currents supplied by the geophone 60 goes through a reversal.

Consider now Fig. 5 which represents diagrammatically a double balanced modulator designated on Fig. 2 by blocks 62 and 65. Let the voltage applied across the input terminals 247a, 247b, be designated as $E \sin 2\pi ft$ and and voltage applied across the terminals 275a, 275b be designated as $E \sin (2\pi ft + \theta)$. It can be shown that when $\theta \neq 0$ the D.C. component of the voltage across the output terminals 276a, 276b is zero. It has been stated above that a noise signal uniformly distributed over the frequency range of a determined width is applied across the input terminals 247a, 247b. It is then apparent that if we integrate the contribution due to all the noise frequencies over the entire band for all the frequencies with the exception of the frequency component $f$ corresponding to the useful seismic signal, then the D. C. voltage across the output terminals 276a, 276b will be zero. It is also apparent that the noise component corresponding to the frequency $f$ is infinitesimal. Consequently, the total noise signal will not contribute at all to the D. C. component of the voltage across the output terminals 276a, 276b. Therefore a D. C. component will appear across the output terminals 276a, 276b only if there is a useful seismic signal impressed across the input terminals 247a, 247b and if the frequency $f$ of this signal is equal to the frequency $f$ of the voltage applied across the terminals 275a, 275b.

The circuit illustrated in Fig. 5 comprises a bridge circuit consisting of four rectifiers 301, 302, 303, 304, each of the said rectifiers constituting a separate arm of the bridge circuit and arranged so that the current can flow only in an anticlockwise direction. The upper corner of the bridge 305 and the lower corner of the bridge 306 are respectively connected to the input terminals 247a, 247b and are also connected one to another by means of equal resistances 307 and 308 in series. The other corners of the bridge 309, 310 are respectively connected to the output terminals 276a, 276b and are also connected one to another by a pair of equal resistances 311 and 312 in series. The other input terminals 275a, 275b of the balanced modulator are respectively connected to the point 313 connecting the resistances 307, 308 and to the point 314 connecting the resistances 312, 311.

With the circuit as described, current derived from the terminals 247a, 247b may flow either through the rectifiers 302, 303 or through the rectifiers 304, 301 depending upon its direction but it can never flow through all the four rectifiers at the same time, since the rectifiers 302, 303 on one hand and the rectifiers 304, 301 on the other hand are arranged to flow in opposite directions.

Suppose now for purposes of illustration that the voltage derived from the terminals 275a, 275b and the voltage derived from the terminals 247a, 247b are simultaneously applied, and suppose that both voltages are in phase, i. e., the terminal 247a becomes positive as compared to the terminal 247b and at the same time the terminal 275a becomes positive as compared to the terminal 275b. Then one part of the current tends to flow from the terminal 275a to the terminal 313 and through the resistor 307 to the terminal 305 and then through the rectifier 302 and through the resistor 311 back to the terminal 275b. The other part of the current tends to flow from the terminal 275a to the terminal 313 and through the resistor 308 back to the terminal 306 and through the rectifier 304 and through the resistor 312 back to the terminal 275b. The currents flowing through the resistors 311, 312 are equal and of opposite directions.

It is apparent that under the conditions described in the preceding paragraph the polarity of the terminals 305, 306 will be positive with respect to the polarity of the terminals 309, 310. Consequently, positive voltages are applied to rectifiers 302, 304. Therefore these rectifiers will lose their ability of rectifying currents, and will allow currents to traverse them in both directions. At the same time negative voltages are applied to rectifiers 301 and 303. Consequently, the rectifiers 301, 303 will retain their rectifying ability and will block currents attempting to traverse them in the negative direction. Therefore the rectifiers 302 and 304 are conductive in both directions and consequently, when a signal voltage is being developed across the terminals 247a, 247b we find that a current tends to pass from the terminals 247a to the terminal 305 and then through the rectifier 302 through the resistors 311 and 312 to the terminal 310, then through the rectifier 304 back to the terminal 247b. This current superposes itself upon the current which is already flowing through the resistors 311 and 312 and consequently the resultant current passing through the resistor 311 becomes larger than the current passing through the resistor 312. Consequently, the balancing that existed before is offset because there is a situation where the current flow through the resistor 311 is increased as compared to the current flow through the resistor 312. Thus the voltage drop across the resistor 311 becomes greater and a positive overall voltage is developed across the terminals 276a, 276b. It is thus apparent that the existence of the two voltages, in phase, one applied to the terminals 275a, 275b and the other applied to the terminals 247a, 247b creates a voltage across terminals 276a, 276b of a definite polarity.

It can be shown that if the polarity of the first input voltage would reverse with respect to the second input voltage, i. e., if we suppose that the terminal 275a becomes positive as compared to the terminal 275b and the terminal 247a becomes negative as compared to the terminal 247b the current flow through the resistor 312 is increased as compared to the current flow through the resistor 311. Then the voltage drop across the resistor 312 becomes larger and the overall voltage developed across the output terminals 276a, 276b has a polarity opposite to the case described above.

It can also be shown that in an intermediate situation where the signal voltage derived from the input terminals 275a, 275b is displaced by 90 degrees with respect to the voltage derived from the input terminals 247a, 247b then the D. C. voltage output from the ring modulator is zero.

In general, if we designate the voltage applied across the terminals 247a, 247b as $E_1 \sin 2\pi ft$ and the voltage applied across the terminals 275a, 275b as $E_2 \sin (2\pi ft + \theta)$ then the voltage developed across the output terminals 276a, 276b can be represented as $E_2 \cos \theta$.

Consider now again Fig. 2 in which there is shown also diagrammatically the earth cross-section below the source of seismic waves 28 and the geophone 60. The numeral 600 indicates the upper layer composing the first thousand feet or so of the earth's crust. Beneath this there is shown a hard underlying stratum 601.

It is apparent that as the flywheel 30 revolves, there will be a vertical component of force directed toward the earth. This is indicated by the equation:

$$F = W + C \sin 2\pi ft \qquad (1)$$

Where W is the normal force due to the weight of the device, $f$ is the impressed frequency and C is the amplitude of the impressed vibratory motion. It is apparent that the value of the frequency $f$ is determined by the condenser 21, i. e., by the instantaneous position of the shaft of the self-synchronous motor 23. We have assumed that the speed of rotation of the Selsyn motors 22 and 23 is extremely slow compared to the speed of the motor 26. Therefore in order to consider the effects of the impressed frequency $f$ which is determined by the rotational speed of the motor 26 we shall assume that the shaft of the Selsyn motor 22 is stationary.

The displacement of the earth's surface then will be:

$$h = k \sin 2\pi ft \qquad (2)$$

neglecting the effect of the weight which is constant. The constant $k$ expresses the proportionality of the two sides of the equation.

As already stated, the functioning of the flywheel 30 will alternately depress and raise the surface of the earth. The waves resulting from the motion of the earth's surface will extend in all directions with some type of spherical form. We have assumed that the geophone 60 is located at the distance $d_1$ from the vibrator 28, the said distance being measured along the ground surface. Some waves will propagate on the surface of the earth directly from the vibrator 28 to the geophone 60, some will penetrate below the ground and be reflected from the surface 590 of the lower bed located at a depth $d_2$. The surface wave travels a shorter distance from the vibrator 28 to the geophone 60 than any reflected, diffracted, or refracted wave. The direct surface wave is indicated by the numeral 610 and the downwardly traveling indirect wave which becomes subsequently diffracted and returned to the ground surface is indicated by the numeral 611. Another wave designated by the numeral 612 travels downward to the subsurface 590, then it becomes reflected and returned to the geophone 60.

It is apparent that the waves 610, 611 and 612 superpose themselves at the point at which the geophone 60 is located and that the geophone motion will represent a resultant wave which represents the interference effect due to the waves 610, 611, 612.

In order to facilitate the explanation of the method we shall assume idealized and simplified conditions under which only two waves, i. e., the waves 610 and 611 are present and we shall consider the interference effect due to these waves. It is apparent that the maxima or minima resulting from the interference depend on the difference in length of paths traversed by the waves 610 and 611 respectively. This is further dependent on the depth and the slope of the stratum 601. As shown in Fig. 2 the length of the direct path 610 is the length of the segment $AB = d_1$ and the length of the indirect path 611 is the sum of the segments AC, CD and DB and is equal to $2d_2 + d_1$ since $AC = DB = d_2$ and $AB = CD = d_1$ In general, the time $t$ is equal to distance $d$, divided by the propagation speed $v$:

$$t = \frac{d}{v} \quad (3)$$

Therefore if we assume a horizontal upper and lower surface of the layer 600, a constant frequency of the vibrator 28, and neglect any phase discontinuity, the difference in time ($t_1$) between the two paths 610 and 611 will become:

$$t_1 = \frac{2d_2}{v_1} + d_1\left(\frac{1}{v_2} - \frac{1}{v_1}\right) \quad (4)$$

Where
$v_1$, the phase speed in the upper stratum 600
$v_2$, the phase speed in the lower stratum 601

It is therefore to be seen that the Formula 4 takes into account the fact that the velocity changes with the depth and with the different types of structures. Consequently, it will be necessary to experiment from known depths to determine the terms $v_1$ and $v_2$.

It is therefore apparent that the two waves 610 and 611 produce a resultant wave which can be expressed as follows:

$$h = k_1 \sin 2\pi f t + k_2 \sin 2\pi f(t - t_1) \quad (5)$$

Additional terms may be added for additional waves such as the wave 612. The terms $k_1$ and $k_2$ are proportionality factors, which depend upon the elasticity and absorption characteristics of the earth's strata.

It is therefore apparent from the Equation 5 that the geophone 60 is subjected to a sinusoidal motion having the impressed frequency $f$ and an amplitude which is determined by the time difference $t$, between the two components of the expression (5). The amplitude of the geophone output as defined by the expression (5) constitutes the useful seismic signal referred to above and is being impressed upon the photographic strip of paper 92 in a manner explained hereinbefore.

Consider now an instant later when the Selsyn motor 23 has performed a very small angular displacement. Then a new and slightly different frequency $f$ is being generated by the vibrator 28. By referring now to the expression (5) we can readily realize that the interfering waves 610 and 611 striking the geophone 60 will be characterized by slightly different values of $f$ and $t_1$. Consequently, the useful seismic signal picked up by the geophone 60 will have a slightly different value. At the same time the Selsyn 93 has performed a small angular rotation and has displaced the paper strip 92 which receives by means of the source of light 123 and the mirror 122 an indication of the new useful seismic signal derived from the geophone 60.

It is apparent that by continuously varying the displacement of the self-synchronous motors 22 and 93 a trace is being produced upon the strip 92, this trace being similar to the graph of Fig. 3. The longitudinal displacements of the strip 92 represent the frequencies of the impressed waves and the transversal deflections of the beam of light represent the useful seismic signals derived from the geophone 60. Consequently it is apparent that the curve recorded upon the strip 92 represents the frequency-amplitude characteristic of the various impressed waves detected by the geophone 60 and due to the vibrator 28.

It is apparent that in a homogeneous medium the vibration amplitude decreases inversely with distance for space waves, and inversely with the square of the distance for surface waves. Further, there is an exponential decrease due to absorption. In a stratified medium such as shown in Fig. 2 the directly transmitted waves 610 interfere with the reflected and refracted waves because of their path and their phase difference. The amplitude frequency curve such as shown in Fig. 3 is therefore not uniform as in a homogeneous medium, but shows a series of maxima or minima, the said maxima being designated by the points $A_1$ $B_1$, $C_1$, $D_1$, and $E_1$ in Fig. 3.

It is also apparent from the preceding paragraphs that since the phase difference between the surface wave and the underlayer wave is $$\Delta \varphi = t_1 = \frac{2d_2}{v_1} + d_1\left(\frac{1}{v_2} - \frac{1}{v_1}\right) \quad (6)$$

therefore a maximum in amplitude occurs when $$\pm 2\pi f \left[\frac{2d_2}{v_1} + d_1\left(\frac{1}{v_2} - \frac{1}{v_1}\right)\right] = 2i\pi \quad (7)$$

and a minimum occurs when $$\pm 2\pi f \left[\frac{2d_2}{v_1} + d_1\left(\frac{1}{v_2} - \frac{1}{v_1}\right)\right] = (2i \pm 1)\pi \quad (8)$$

where $f$ is the frequency impressed by the vibrator 28 and $i = 0, 1, 2, 3, 4$.

It is noted that the ratio of two frequencies at which successive minima occurs is equal to the ratio of two successive uneven numerals or $$\frac{2i - 1}{2i + 1} \quad (9)$$

whereas the frequency ratio corresponding to two successive maxima is equal to the ratio of two successive numbers or $$\frac{i}{i + 1} \quad (10)$$

The condition corresponding to the frequencies $f$ defined by the expression (7) is known as resonance. Since the returning indirect wave 611 is in phase and is of the same frequency as the direct surface wave 610, it need now only overcome the viscosity and not the elasticity of the earth materials, and the resulting increase of amplitude may be greatly amplified. Resonance is to be considered the strongest indication of reflection or refraction from subterranean strata. Various resonance points resulting from the interference of waves 610 and 611 are designed as $A_1$, $B_1$, $C_1$, $D_1$, and $E_1$ in the diagram of Fig. 3.

Let $f_1$ be the abscissa corresponding to the lowest resonance point $A_1$. Then by substituting $i=1$ in the expression (7) it becomes apparent that $$\frac{1}{f_1}=\frac{2d_2}{v_1}+d_1\left(\frac{1}{v_2}-\frac{1}{v_1}\right) \quad (11)$$

wherefrom $$d_2=\frac{v_1}{2}\left[\frac{1}{f_1}-d_1\left(\frac{1}{v_2}-\frac{1}{v_1}\right)\right] \quad (12)$$

It is apparent that $d_1$, $v_1$, $v_2$ can be measured and that $f_1$ can also be measured from the graph of Fig. 3. Consequently, by utilizing the data supplied by the frequency amplitude graph of Fig. 3 the Formula 12 allows us to determine the unknown depth $d_2$ of the underlying geological horizon.

The purpose of the invention, of course, is to find changes in elevation of a particular structure, or structures, lying near the strata supposed to contain oil. An appropriate number of readings at intervals over a given territory will be sufficient to map the subterranean contours.

I claim:

1. Method of subsurface seismic surveying which comprises generating a periodic disturbance in the earth and varying the frequency of said disturbance in accordance with a predetermined function, receiving the resultant seismic waves travelling through the earth at a point removed from the source of said disturbance, transforming said received seismic waves into corresponding electrical currents, selectively receiving said currents and varying the selectivity of said reception simultaneously with the variation of the frequency of said disturbance, the variation of selectivity of said reception being effected in accordance with said predetermined function, and recording said selectively received waves.

2. Method of subsurface seismic surveying which comprises generating a periodic disturbance of determined frequency in the earth, receiving the seismic waves caused by said disturbance at a point removed from the source of said disturbance, transforming said received seismic waves into corresponding electrical currents, selectively receiving a component of said currents having the same frequency as said disturbance, simultaneously varying the selectivity of said reception and the frequency of said disturbance, whereby the frequency of said selected component follows the frequency of said disturbance in such a manner that at any selected instant the frequency of said selected component is equal to the frequency of said disturbance, and producing a graph representing the variation of the magnitude of said component with the varying frequency of said disturbance.

3. Apparatus for seismic surveying comprising means positioned at a selected location with reference to the earth for generating a periodic disturbance in the earth, a control element connected to said means for varying in a determined manner the frequency of said disturbance, means conveniently distant from said location for receiving seismic waves caused by said disturbance and transforming said waves into corresponding electrical variations, a selective network connected to said receiving means for selectively receiving said variations, and means connected to said controlling element for varying the selectivity of said network simultaneously with and in the same manner as the variation of the frequency of said disturbance, whereby the frequency selected by said network is at any instant equal to the frequency of said disturbance, and a recorder connected to said network for recording the output of said network.

4. An arrangement for seismic surveying comprising a generator placed at a convenient location with reference to the earth for imparting a frequency modulated seismic wave having predetermined amplitude characteristics into the earth, a geophone conveniently distant from said generator for receiving a portion of said frequency modulated waves after said portion has been influenced by the travel in the earth and for translating said wave into a corresponding frequency modulated current, means for producing a signal representing the modulating component expressing the frequency variation of said wave, means connected to said receiver for producing another signal representing the amplitude of said current and means responsive to said signal and to said other signal for producing a resultant signal.

5. An arrangement for seismic prospecting comprising a generator positioned at a selected location with respect to the earth's surface for imparting an energy wave of a determined frequency into the earth, thereby causing said wave to traverse a portion of the earth, a control element connected to said generator for varying the frequency of said waves, a geophone conveniently distant from said location for receiving seismic vibrations caused by said energy wave and for producing a current representing said vibrations, said current having a significant component originated by said generator and having frequency following the frequency of said generator and neighboring non-significant frequency components representing the disturbances present in the earth, means for producing a current of known magnitude and of frequency following the frequency of the generator and equal at all times to the frequency of the generator, a modulator responsive to said current and to the output of said source for producing modulation products, said modulation products having components of various frequencies and including a useful D. C. component, an electric filter connected to said modulator for selectively transmitting said D. C. component and for attenuating the remaining A. C. components, and an indicator connected to said filter for providing an index of its output, said index representing the magnitude of said significant frequency components.

6. An arrangement for seismic prospecting comprising a generator positioned at a selected location with respect to the earth's surface for imparting an energy wave of varying frequency into the earth, thereby causing said wave to traverse a portion of the earth, a geophone conveniently distant from said location for receiving seismic vibrations caused by said energy wave and for producing an electrical current representing the magnitude of said vibrations, means responsive to the imparted and received waves for producing a first signal indicating a phase relationship therebetween, means for producing a second signal representing the frequency variation of said waves, and means responsive to said first and second signal for producing a resultant signal.

7. An arrangement for studying the vibrations in a given medium, comprising a detector placed at a convenient location with reference to said medium for translating said vibrations into electrical currents, a filter connected to said detector for selectively transmitting a portion of said currents, a control element connected to said filter for varying the selectivity thereof, a recorder connected to the output of said filter, and a means operatively connected to said recorder and to said control element for operating said recorder and simultaneously varying the selectivity of said filter.

8. A method of measuring a significant seismic signal of a known frequency, the said signal being accompanied by microseisms distributed over the frequencies neighboring said known frequency, comprising the step of translating said seismic signal and said microseisms into an electrical current having a frequency component corresponding to the significant seismic signal and neighboring frequency components corresponding to microseisms, the step of producing a reference current having the frequency of said significant seismic signal, the step of intermodulating said electrical current with said reference current thereby producing modulation products the D. C. component of which corresponds to said useful seismic signal and the A. C. components of which correspond to said microseisms, the step of selectively receiving substantially said D. C. component by simultaneously attenuating a substantial contribution of said A. C. component, and the step of measuring said D. C. component as an index of the magnitude of said significant seismic signal.

SERGE A. SCHERBATSKOY.

REFERENCES CITED

The following references are of record in the file of this patent:

UNITED STATES PATENTS

| Number | Name | Date |
|---|---|---|
| Re. 21,955 | Chaffee | Nov. 25, 1941 |
| 1,515,227 | Staege | Nov. 11, 1924 |
| 1,948,671 | Potter | Feb. 27, 1934 |
| 1,976,481 | Castner | Oct. 9, 1934 |
| 1,987,720 | Staege | Jan. 15, 1935 |
| 1,991,066 | Staege | Feb. 12, 1935 |
| 2,003,780 | Born | June 4, 1935 |
| 2,011,315 | Gilbert | Aug. 13, 1935 |
| 2,011,392 | Bentley | Aug. 13, 1935 |
| 2,053,841 | Prescott | Sept. 8, 1936 |
| 2,049,724 | Prescott et al. | Aug. 4, 1936 |
| 2,053,841 | Prescott | Sept. 8, 1936 |
| 2,065,421 | Bernarde | Dec. 22, 1936 |
| 2,103,847 | Hansell | Dec. 28, 1937 |
| 2,113,164 | Williams, Jr. | Apr. 5, 1938 |
| 2,117,894 | Lenehan | May 17, 1938 |
| 2,154,375 | Chambers | Apr. 11, 1939 |
| 2,156,259 | Blau | May 2, 1939 |
| 2,173,902 | Gerth et al. | Sept. 26, 1939 |
| 2,200,103 | Shutt | May 7, 1940 |
| 2,207,398 | Floyd | July 9, 1940 |
| 2,209,100 | Minton | July 23, 1940 |
| 2,209,369 | Wills | July 30, 1940 |
| 2,215,297 | Owen | Sept. 17, 1940 |
| 2,228,163 | Cohen | Jan. 7, 1941 |
| 2,256,482 | Isbister et al. | Sept. 23, 1941 |
| 2,275,735 | Cloud | Mar. 10, 1942 |
| 2,275,736 | Cloud | Mar. 10, 1942 |
| 2,286,106 | Ritzmann | June 9, 1942 |
| 2,303,654 | Newton | Dec. 1, 1942 |
| 2,316,317 | Curtis | Apr. 13, 1943 |
| 2,316,434 | Irwin | Apr. 13, 1943 |
| 2,320,248 | Shimek | May 25, 1943 |

FOREIGN PATENTS

| Number | Country | Date |
|---|---|---|
| 432,106 | Great Britain | 1935 |